United States Patent [19]
Tsutsumi

[11] Patent Number: 5,742,496
[45] Date of Patent: Apr. 21, 1998

[54] INVERTOR APPARATUS FOR CONVERTING A DC VOLTAGE TO A SINGLE-PHASE AC VOLTAGE

[75] Inventor: Tsuyoshi Tsutsumi, Tokyo, Japan

[73] Assignee: NEC Corporation, Japan

[21] Appl. No.: 740,202

[22] Filed: Oct. 24, 1996

[30] Foreign Application Priority Data

Oct. 31, 1995 [JP] Japan .................... 7-283538

[51] Int. Cl.[6] .......................... H02M 3/24; H02M 3/335; H02M 1/12
[52] U.S. Cl. .................. 363/95; 363/21; 363/41
[58] Field of Search ..................... 363/17, 40, 41, 363/95, 20, 21, 63, 43

[56] References Cited

U.S. PATENT DOCUMENTS

4,399,499 8/1983 Butcher et al. ............................. 363/17
4,586,119 4/1986 Sutton ......................................... 363/17

Primary Examiner—Peter S. Wong
Assistant Examiner—Bao Q. Vu
Attorney, Agent, or Firm—Ostrolenk, Faber, Gerb & Soffen, LLP

[57] ABSTRACT

An inverter apparatus wherein a sine wave AC voltage is produced from an output of a converter circuit which converts an input DC voltage into positive and negative sine half wave voltages of a voltage value corresponding to a width of a driving pulse. First and second switch circuits are provided for output lines of the positive and negative sine half wave voltages of the converter circuit. A plurality of pulses are generated within a half cycle of the AC output voltage of the converter circuit, and based on the pulse signal, when the positive sine half wave voltage is to be formed, the second switch circuit is put into an off state while the first switch circuit and the converter circuit are driven, but when the negative sine half wave voltage is to be formed, the first switch circuit is put into an off state while the second switch circuit and the converter circuit are driven. The width of each pulse of the pulse signal is modulated so that the AC output voltage may be a sine wave AC voltage.

6 Claims, 8 Drawing Sheets

INVERTOR APPARATUS FOR CONVERTING A DC VOLTAGE TO A SINGLE-PHASE AC VOLTAGE

BACKGROUND OF THE INVENTION

1. Field of the Invention

This invention relates to an inverter apparatus for converting a DC voltage into a single-phase AC voltage.

2. Description of the Prior Art

Figure 1:
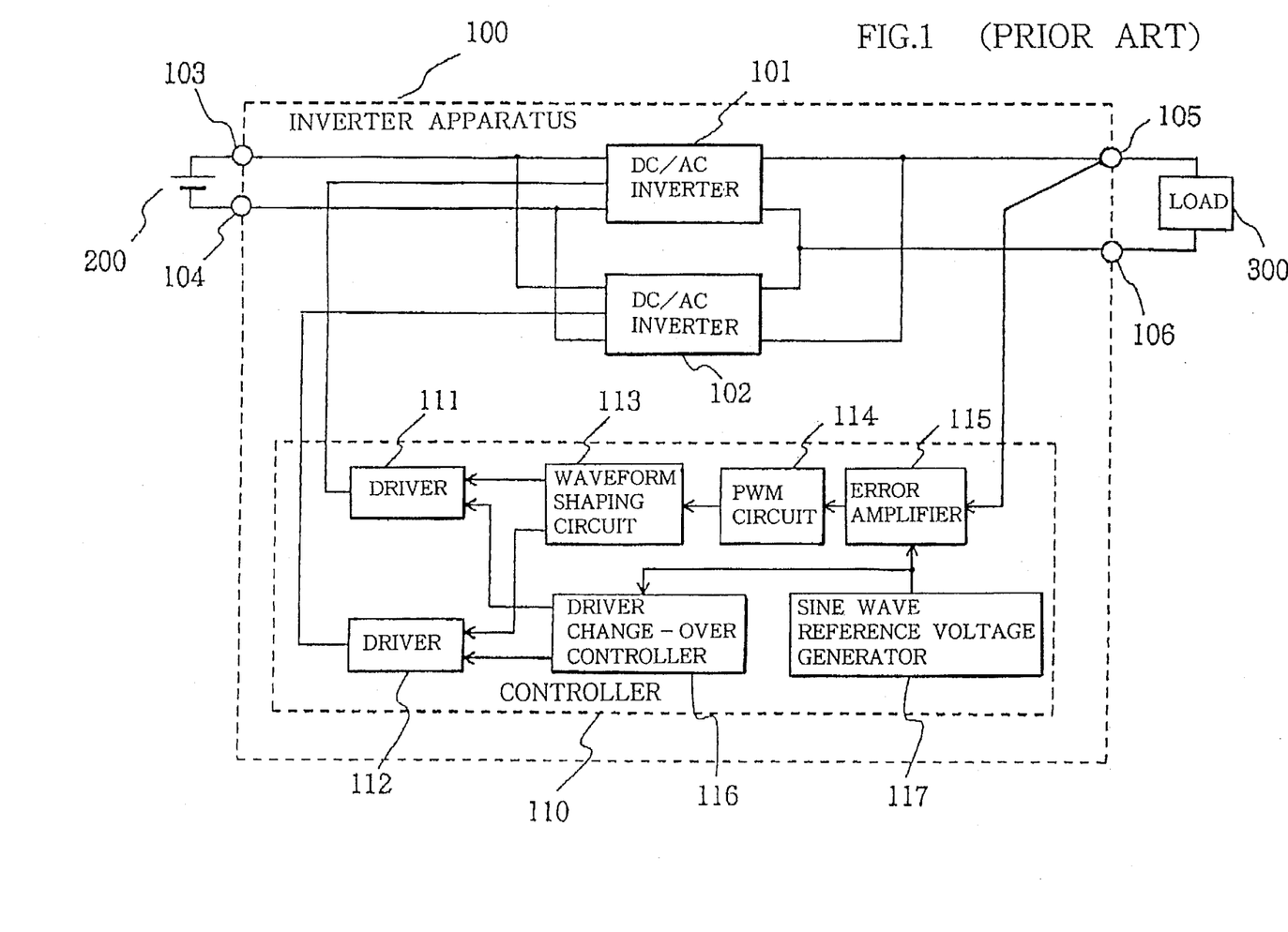
FIG. 1 is a block diagram showing a general construction of an inverter apparatus disclosed in Japanese Patent Laid-Open Application No. Heisei 5-146158.

Conventionally, an inverter apparatus of the type mentioned is used in order to convert a DC voltage into a stabilized AC voltage as disclosed, for example, in Japanese Patent Laid-Open Application No. Heisei 5-146158. FIG. 1 shows a general construction of the inverter apparatus disclosed in the document.

Referring to FIG. 1, inverter apparatus 100 converts a DC voltage from DC power supply 200 connected to input terminals 103 and 104 into a single-phase AC voltage and supplies the single-phase AC voltage to load 300 connected to output terminals 105 and 106. Inverter apparatus 100 includes a pair of DC/AC inverters 101 and 102, a pair of drivers 111 and 112, and controller 110 for controlling driving of drivers 111 and 112. In the following, the individual components are described in detail.

Each of DC/AC inverters 101 and 102 converts a DC voltage inputted thereto into an AC voltage, and has input lines connected to input terminals 103 and 104 thereof and has output lines connected to output terminals 105 and 106 thereof.

Controller 110 includes driver 111 for driving DC/AC inverter 101, driver 112 for driving DC/AC inverter 102, and waveform shaping circuit 113, PWM circuit 114, error amplifier 115, driver change-over controller 116 and sine wave reference voltage generator 117 for controlling drivers 111 and 112.

Error amplifier 115 has a pair of input terminals to one of which an output voltage of output terminal 105 is inputted and to the other of which an output of sine wave reference voltage generator 117 is inputted, and compares an output voltage value at output terminal 105 and a reference waveform from sine wave reference voltage generator 117 with each other to form an error signal, which is outputted from error amplifier 115. PWM circuit 114 internally produces a saw-tooth pulse and receives an output of error amplifier 115 as an input thereto. PWM circuit 114 compares the error signal outputted from error amplifier 115 with the saw-tooth pulse and outputs a PWM signal corresponding to a voltage level of the error signal.

Waveform shaping circuit 113 receives an output of PWM circuit 114 as an input thereto, separates, from the PWM signal, signals for individually controlling DC/AC inverters 101 and 102, and outputs the signals to drivers 111 and 112, respectively.

Drivers 111 and 112 drive DC/AC inverters 101 and 102 based on the signals separated and extracted from the PWM signal by waveform shaping circuit 113. As drivers 111 and 112 drive DC/AC inverters 101 and 102 based on the signals separated and extracted from the PWM signal by waveform shaping circuit 113, respectively, DC power from DC power supply 200 is converted into high frequency power. On the output side, the high frequency power is rectified and smoothed to obtain an output voltage of the inverter. When the width of the driving pulse signal is small, the output voltage of the inverter is low, but when the width is large, the output voltage is high.

Driver change-over controller 116 controls driving of drivers 111 and 112 based on a reference waveform from sine wave reference voltage generator 117.

Figure 2:
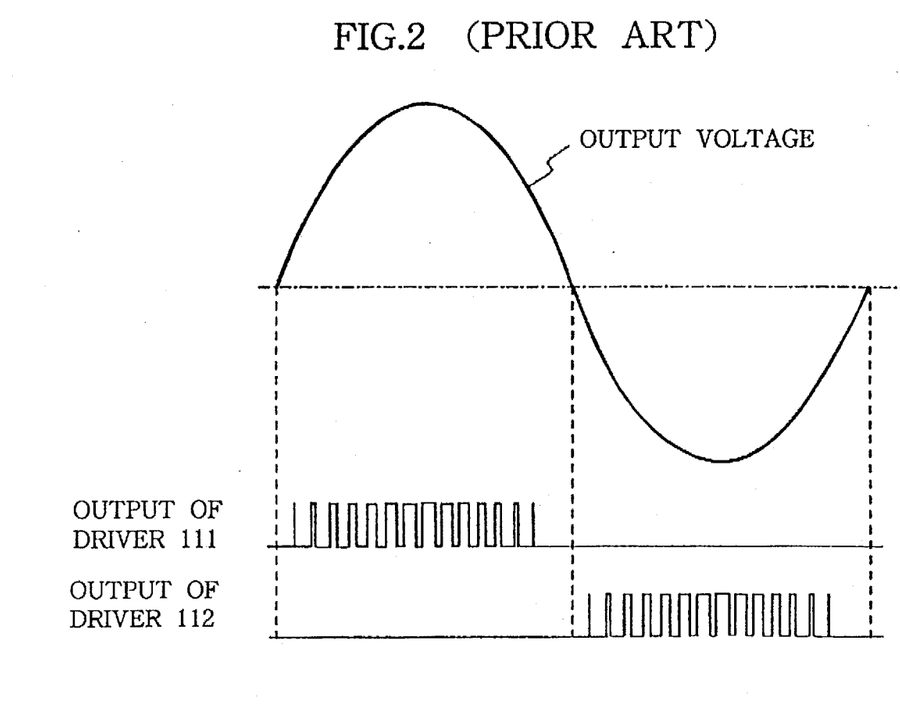
FIG. 2 is a time chart illustrating operation of the conventional inverter apparatus shown in FIG. 1.

In the inverter apparatus having the construction described above, drivers 111 and 112 are alternately driven for each half cycle of the sine wave output voltage (output voltage of the inverter) under the control of driver change-over controller 116 so that sine wave voltages of two half cycles are produced by the two systems of DC/AC inverters to obtain an AC output voltage. Further, the AC output voltage is smoothed into a fixed voltage by adjusting the width of each pulse of the driving pulse signals with a detected value of the AC output voltage in such a manner as seen, for example, in FIG. 2 by means of controller 110 to perform negative feedback control.

However, in the conventional inverter apparatus described above, since it is constructed such that sine wave voltages of half cycles are produced by the two systems of DC/AC inverters, there is a problem in that it includes a large number of parts and is complicated in circuit configuration. Further, where the load connected to the inverter apparatus is a complex load, reactive power is yielded on the output side, and consequently, there is another problem in that the reactive power produces waveform distortion in the sine wave AC output voltage of the inverter apparatus.

SUMMARY OF THE INVENTION

It is an object of the present invention to provide an inverter apparatus and a sine wave AC voltage forming method by which reduction in number of parts and reduction in size of the apparatus can be achieved solving the problems described above.

It is another object of the present invention to provide an inverter apparatus and a sine wave AC voltage forming method by which, even if a complex load is connected to the inverter apparatus, no waveform distortion is produced in the sine wave AC output voltage of the inverter apparatus by reactive power yielded on the output side.

In order to achieve the first object described above, according to an aspect of the present invention, there is provided an inverter apparatus which includes a converter circuit which receives a DC voltage as an input thereto and converts the DC voltage into positive and negative sine half wave voltages of a voltage value corresponding to a width of a driving pulse and produces an AC output voltage from an output of the converter circuit, comprising first and second switch circuits provided for output lines of the positive and negative sine half wave voltages of the converter circuit, respectively, and a controller for generating a plurality of pulses within a half cycle of the AC output voltage and putting, when the positive sine half wave voltage is to be formed, the second switch circuit into an off state and driving the first switch circuit and the converter circuit, but putting, when the negative sine half wave voltage is to be formed, the first switch circuit and driving the second switch circuit and the converter circuit, based on the pulse signal, the controller modulating the width of each pulse of the pulse signal so that the AC output voltage may be a sine wave AC voltage.

The inverter apparatus described above may be constructed such that the converter circuit includes a transformer and is constructed such that power is accumulated by DC current in an on state thereof and the accumulated power is transmitted in an off state thereof to obtain positive and negative DC outputs, and the controller includes a sine wave reference voltage generator for generating a sine wave reference voltage, an error amplifier for comparing the AC output voltage with the sine wave reference voltage to obtain an error signal and outputting the error signal, a reference clock generator for generating a reference clock signal, a PWM circuit for producing a saw-tooth pulse signal synchronized with the reference clock signal and comparing the saw-tooth pulse with the error signal to produce a PWM signal of a pulse width corresponding to a voltage level of the error signal, and a waveform shaping circuit for producing, based on the PWM signal, a first driving signal for driving the converter circuit and second and third driving signals for driving the first and second switch circuits, respectively, the waveform shaping circuit being constructed such that, when the positive sine half wave voltage is to be formed, the PWM signal is used as the first driving signal and a signal obtained by inverting the first driving signal in phase is used as the second driving signal whereas the third driving signal is put into an off state, but when the negative sine half wave voltage is to be formed, the PWM signal is used as the first driving signal and a signal obtained by inverting the first driving signal in phase is used as the third driving signal whereas the second driving signal is put into an off state.

According to another aspect of the present invention, there is provided a sine wave AC voltage forming method for producing a sine wave AC voltage from a converter circuit which converts an input DC voltage into positive and negative sine half wave voltages of a voltage value corresponding to a width of a driving pulse, comprising the steps of providing first and second switch circuits for output lines of the positive and negative sine half wave voltages of the converter circuit, and generating a plurality of pulses within a half cycle of the AC output voltage outputted from the converter circuit, putting, when the positive sine half wave voltage is to be formed, the second switch circuit into an off state while driving the first switch circuit and the converter circuit, but putting, when the negative sine half wave voltage is to be formed, the first switch circuit into an off state while driving the second switch circuit and the converter circuit, based on the pulse signal, and modulating the width of each pulse of the pulse signal so that the AC output voltage may be a sine wave AC voltage.

The sine wave AC voltage forming method described above may be constructed such that the converter circuit is constructed so as to have a transformer structure wherein power is accumulated by DC current in an on state of the converter circuit and the accumulated power is transmitted in an off state of the converter circuit to obtain positive and negative DC outputs, and an output voltage of the converter circuit is compared with a sine wave reference voltage to produce an error signal and the error signal is compared with a saw-tooth pulse synchronized with a reference clock signal to produce a PWM signal of a pulse width corresponding to a voltage level of the error signal, and a first driving signal for driving the converter circuit and second and third driving signals for driving the first and second switch circuits, respectively, are produced based on the PWM signal, and then, when the positive sine half wave voltage is to be formed, the PWM Signal is used as the first driving signal and a signal obtained by inverting the first driving signal in phase is used as the second driving signal whereas the third driving signal is put into an off state, but when the negative sine half wave voltage is to be formed, the PWM signal is used as the first driving signal and a signal obtained by inverting the first driving signal in phase is used as the third driving signal whereas the second driving signal is put into an off state.

In order to achieve the second object of the present invention described above, the inverter apparatus described above may be constructed such that the waveform shaping circuit detects the polarity of the error signal between positive and negative and is constructed such that, when the positive sine half wave voltage is to be formed, only when the error signal is positive, the PWM signal is used as the first driving signal, but when the error signal is not positive, the first and second driving signals are put into an off state, but when the negative sine half wave voltage is to be formed, only when the error signal is negative, the PWM signal is used as the first driving signal, but when the error signal is not negative, the first and third driving signals are put into an off state, and the controller further includes an output voltage waveform distortion detecting circuit for detecting, when the first driving signal is put into an off state upon formation of the positive or negative sine half wave voltage, the state as a state wherein a waveform distortion is produced in the AC output voltage by reactive power, and uses, if a waveform distortion is detected upon formation of the positive sine half wave voltage, the PWM signal as a driving signal to drive only the second switch circuit so that the reactive power is accumulated in the transformer and transmitted to the input side, but uses, if a waveform distortion is detected upon formation of the negative sine half wave voltage, the PWM signal as a driving signal to drive only the first switch circuit so that the reactive power is accumulated in the transformer and transmitted to the input side.

Further, the sine wave AC voltage forming method may be constructed such that the polarity of the error signal between positive and negative is detected and, when the positive sine half wave voltage is to be formed, only when the error signal is positive, the PWM signal is used as the first driving signal, but when the error signal is not positive, the first and second driving signals are put into an off state, but when the negative sine half wave voltage is to be formed, only when the error signal is negative, the PWM signal is used as the first driving signal, but when the error signal is not negative, the first and third driving signals are put into an off state, and, when the first driving signal is put into an off state upon formation of the positive or negative sine half wave voltage, the state is detected as a state wherein a waveform distortion is produced in the AC output voltage by reactive power, and then, if a waveform distortion is detected upon formation of the positive sine half wave voltage, the PWM signal is used as a driving signal to drive only the second switch circuit so that the reactive power is accumulated in the transformer and transmitted to the input side, but uses, if a waveform distortion is detected upon formation of the negative sine half wave voltage, the PWM signal as a driving signal to drive only the first switch circuit so that the reactive power is accumulated in the transformer and transmitted to the input side.

While the conventional inverter apparatus is constructed so as to produce an AC output voltage using two systems of DC/AC inverter circuits, the inverter apparatus of the present invention is constructed so as to produce an AC output voltage by obtaining two systems of outputs from a converter circuit. Accordingly, drivers and a control circuit which are required because of provision of two DC/AC converters as in the conventional inverter apparatus are not required in the inverter apparatus of the present invention.

In the inverter apparatus of the present invention, a DC voltage is converted into positive and negative sine half wave voltages of a voltage value corresponding to the width of a driving pulse by the converter circuit. The output of the converter exhibits a low level when the width of the driving pulse is small, but exhibits a high level when the width of the driving pulse is large. In the inverter apparatus of the present invention, since the width of the driving pulse is controlled so that the output AC voltage may approach a sine wave reference voltage, the output waveform of the inverter apparatus converges to the sine wave reference voltage.

Further, in the inverter apparatus of the present invention wherein a distortion of the output voltage waveform is detected, if reactive power is yielded, for example, upon formation of a positive sine half wave voltage, on the output side and a waveform distortion is produced in the output voltage waveform, then the waveform distortion is detected. After the waveform distortion is detected, feeding back of the reactive power to the input side by the second switch circuit is performed by the controller. Accordingly, the waveform of the output AC voltage is not distorted much by the reactive power at all.

As described above, according to the present invention, the following effects are achieved:

(1) since the inverter apparatus is constructed such that it includes a circuit which obtains two systems of outputs from a converter circuit, reduction in number of parts and reduction in size of the apparatus can be achieved; and (2) a distortion of the output waveform which is caused by reactive power on the output side can be reduced.

DESCRIPTION OF THE PREFERRED EMBODIMENT(S)

Embodiments of the present invention are described below with reference to the drawings.

<First Embodiment>

Figure 3:
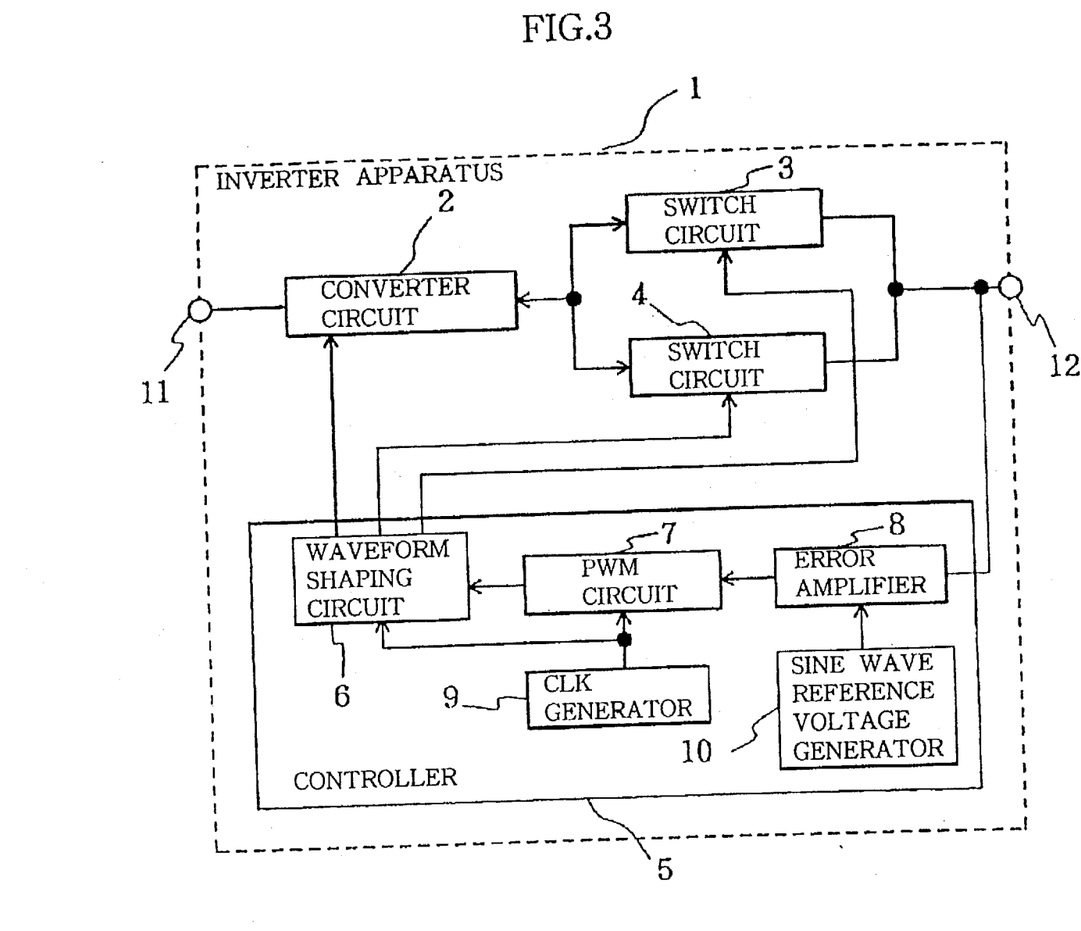
FIG. 3 is a block diagram showing a general construction of an inverter apparatus of a first embodiment of the present invention.

FIG. 3 is a block diagram showing a general construction of an inverter apparatus of a first embodiment of the present invention.

Referring to FIG. 3, inverter apparatus 1 converts a DC voltage inputted to input terminal 11 into a single-phase AC voltage and outputs the single-phase DC voltage from output terminal 12. Inverter apparatus 1 includes converter circuit 2, a pair of switch circuits 3 and 4, and controller 5 for controlling converter circuit 2 and switch circuits 3 and 4.

Converter circuit 2 has an input line connected to input terminal 11 thereof and converts the input DC voltage to positive and negative sine half wave voltages of a voltage value corresponding to the pulse width of a driving signal. More particularly, converter circuit 2 includes a transformer, and accumulates power when it is in an on-state but discharges the accumulated power when it is in an off-state to obtain positive and negative sine half wave voltages.

Controller 5 includes waveform shaping circuit 6, PWM circuit 7, error amplifier 8, CLK generator 9 and sine wave reference voltage generator 10.

Error amplifier 8 has a pair of input terminals to one of which an output voltage of output terminal 12 is inputted and to the other of which an output of sine wave reference voltage generator 10 is inputted, and compares an output voltage value of output terminal 12 and a reference waveform from sine wave reference voltage generator 10 with each other to produce an error signal, which is outputted from error amplifier 8.

PWM circuit 7 has a pair of input terminals to one of which a CLK signal (reference clock signal) is inputted from CLK generator 9 and to the other of which the error signal outputted from error amplifier 8 is inputted, and compares a saw-tooth pulse synchronized with the CLK signal and the error signal with each other to produce and output a PWM signal of a pulse width corresponding to the voltage level of the error signal.

Waveform shaping circuit 6 receives an output of PWM circuit 7 as an input thereto and outputs DRV signals a, b and c for driving converter circuit 2 and switch circuits 3 and 4, respectively. Converter circuit 2 and switch circuits 3 and 4 are driven by DRV signals a, b and c outputted from waveform shaping circuit 6, respectively, to convert the DC voltage into a sine wave AC voltage. In order to form a positive sine half wave voltage, switch circuit 4 is put into an off state while converter circuit 2 and switch circuit 3 are driven, but in order to form a negative sine half wave voltage, switch circuit 3 is put into an off state while converter circuit 2 and switch circuit 4 are driven. Detailed constructions of converter circuit 2 and switch circuits 3 and 4 are shown in FIG. 4, and operation of them is described in detail below.

Figure 4:
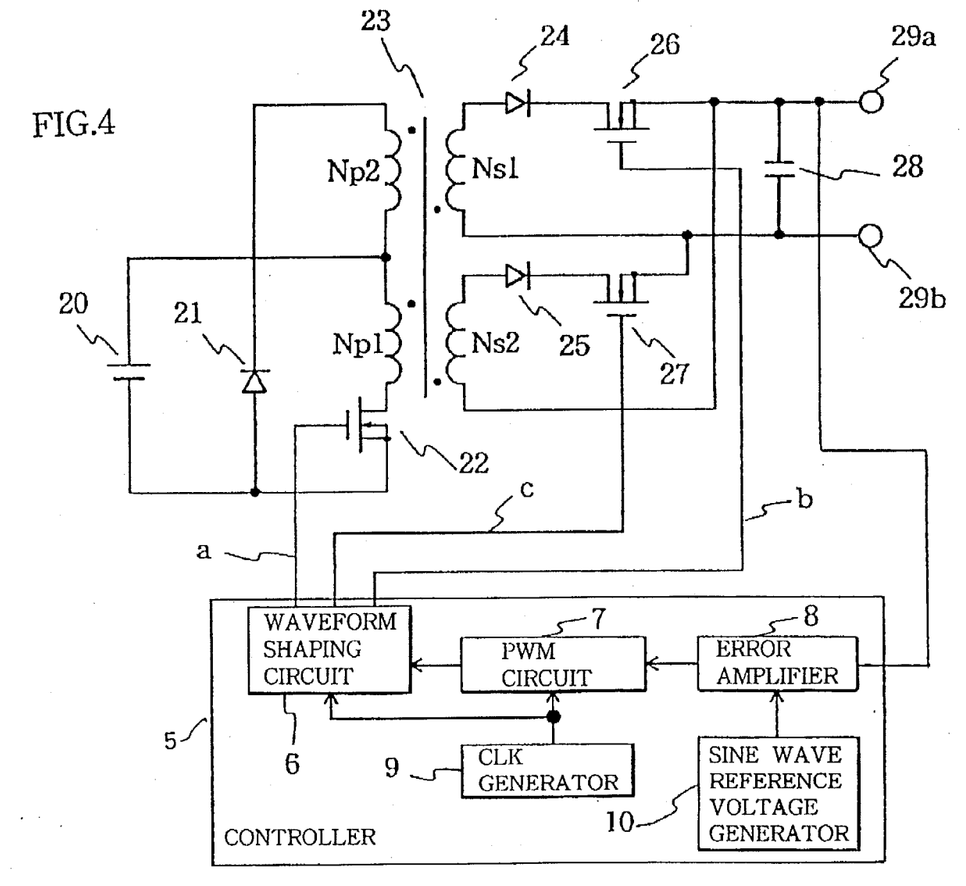
FIG. 4 is a block circuit diagram showing detailed constructions of converter circuit 2 and switch circuits 3 and 4 shown in FIG. 3.

As seen in FIG. 4, a portion formed from converter circuit 2 and switch circuits 3 and 4 described hereinabove has such a construction as described below.

The portion includes a transformer 23 which includes a pair of windings Np1 and Np2 connected in series on the primary side and includes a pair of windings Ns1 and Ns2 on the secondary side. The other end of winding Np1 is connected to the drain of MOSFET 22. On the primary side of transformer 23, DC power supply 20 is provided, the positive side power supply line of which, is connected to a connection line between windings Np1 and Np2 and, the negative side power supply line of which, is connected to the source of MOSFET 22. The negative side power supply line of DC power supply 20 is connected to the other end of winding Np2 via diode 21. The gate of MOSFET 22 is connected to a DRV signal a line extending from controller 5 so that operation of MOSFET 22 is controlled by DRV signal a.

On the secondary side of transformer 23 described above, one end of winding Ns1 is connected to the drain of MOSFET 26 via diode 24, and the other end of winding Ns1 is connected to AC output terminal 29b. The source of MOSFET 26 is connected to AC output terminal 29a. One end of winding Ns2 is connected to the drain of MOSFET 27 via diode 25 and the other end of winding Ns2 is connected to a line which interconnects the source of MOSFET 26 and AC output terminal 29a. The source of MOSFET 27 is connected to a line which interconnects the other end of winding Ns1 and AC output terminal 29b. Further, capacitor 28 is connected in parallel between the line interconnecting the other end of winding Ns1 and AC output terminal 29b and the line interconnecting the source of MOSFET 26 and AC output terminal 29a. The gate of MOSFET 26 is connected to a DRV signal b line extending from controller 5 while the gate of MOSFET 27 is connected to a DRV signal c line so that operation of MOSFET 26 and MOSFET 27 is controlled by DRV signals b and c, respectively.

In inverter apparatus 1 having the construction described above, a voltage value at AC output terminal 29a is first detected and the detected voltage value and a sine wave reference signal from sine wave reference voltage generator 10 are compared with each other by error amplifier 8 so that an error signal is produced. The thus produced error signal is inputted to PWM circuit 7.

When the error signal is inputted, PWM circuit 7 compares the error signal with a saw-tooth pulse synchronized with the CLK signal from CLK generator 9 to produce a PWM signal corresponding to a voltage level of the error signal. The PWM signal thus produced is inputted to waveform shaping circuit 6.

When the PWM signal is inputted, waveform shaping circuit 6 produces three systems of DRV signals a, b and c from the PWM signal. MOSFETs 22, 26 and 27 are controlled based on the thus produced three systems of DRV signals a, b and c, respectively.

In inverter apparatus 1 described above, by the control of MOSFETs 22, 26 and 27 based on the three systems of DRV signals a, b and c, generation of a sine wave voltage of a half cycle by converter circuit 2 and switch circuit 3 and generation of another sine wave voltage of a half cycle by converter circuit 2 and switch circuit 4 are performed. In the following, the generation of the sine wave voltages is described in detail with reference to FIG. 5.

(1) Generation of a Sine Wave Voltage of a Half Cycle by Converter Circuit 2 and Switch Circuit 3

Figure 5:
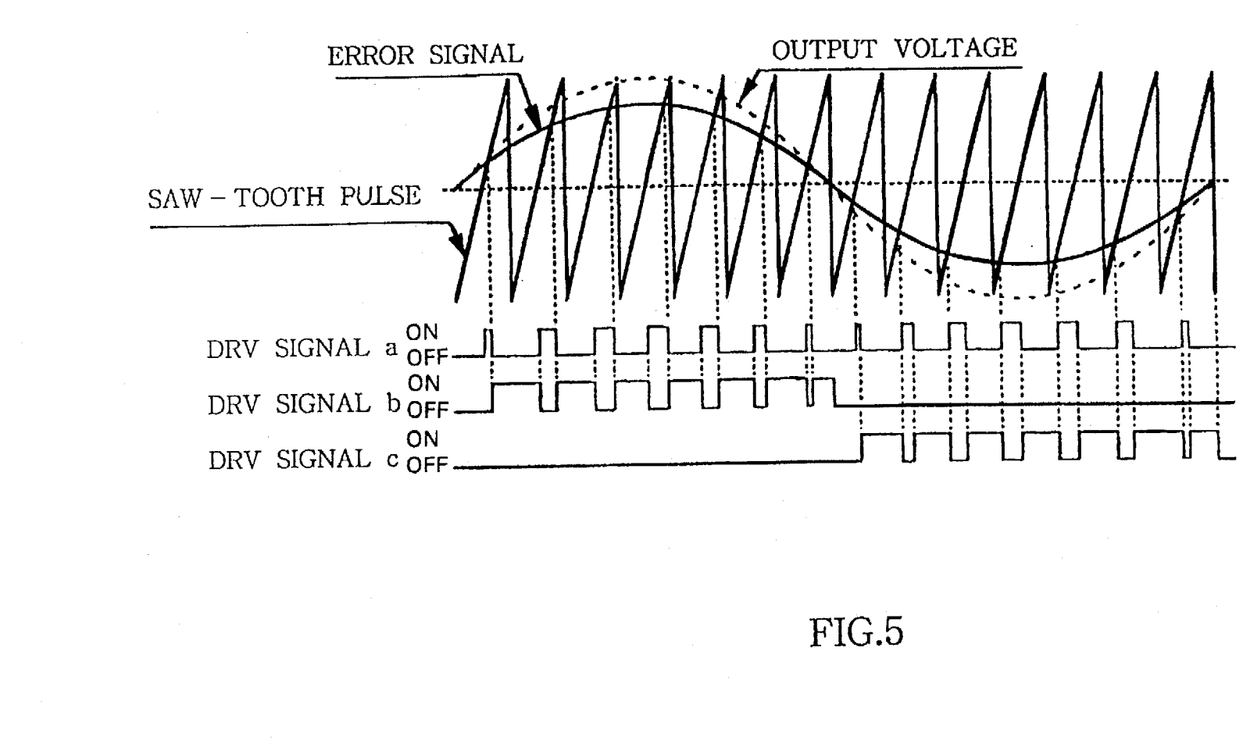
FIG. 5 is a time chart illustrating operation of the inverter apparatus shown in FIG. 4.

When a sine wave voltage of a half cycle is to be generated by converter circuit 2 and switch circuit 3 (shaping of a positive sine half wave voltage), DRV signal a is the same signal as the PWM signal, and DRV signal b is a signal obtained by inverting DRV signal a in phase as seen in FIG. 5. MOSFETs 22 and 26 are driven in the opposite phases to each other by DRV signals a and b outputted from controller 5, respectively. In this instance, DRV signal c is in an off state and is not outputted, and MOSFET 27 is in an inoperative state.

When MOSFET 22 is driven, DC power is converted into high frequency power by transformer 23. In particular, power is accumulated in winding Np1 during an on-period of MOSFET 22, and the power thus accumulated in winding Np1 is transmitted, during an off-period of MOSFET 22, to the secondary side of transformer 23 via winding Ns1. The high frequency power transmitted to the secondary side of transformer 23 is rectified and smoothed by diode 24 and capacitor 28. Since MOSFET 26 is driven in the phase opposite to that of MOSFET 22, MOSFET 26 is in an on-state while the power is being smoothed.

It is to be noted that, although a high frequency voltage is induced also in winding Ns2 by on/off driving of MOSFET 22 described above, since MOSFET 27 is in the inoperative state, it is in a high-impedance state, and consequently, transmission of power via winding Ns2 does not occur.

The pulse width of each of DRV signals a and b varies with respect to time in response to detection of the output of the AC voltage, and when the pulse width is small, the output voltage is low, but when the pulse width is large, the output voltage is high.

Controller 5 performs PWM control of the DRV signals in response to a detected value of the AC output voltage to control the output voltage to a fixed voltage and controls converter circuit 2 and switch circuit 3 to generate a sine wave voltage of a half cycle in such a manner as described above.

(2) Generation of a Sine Wave Voltage of a Half Cycle by Converter Circuit 2 and Switch Circuit 4

When a sine wave voltage of a half wave is to be generated by converter circuit 2 and switch circuit 4 (formation of a negative sine half wave voltage), DRV signal a is the same signal as the PWM signal while DRV signal c is a signal obtained by inverting DRV signal a in phase as seen in FIG. 5. Also here, MOSFET 22 and MOSFET 27 are driven respectively by DRV signals a and c of the opposite phases to each other while DRV signal b is not outputted similarly as in the operation described in paragraph (1) above. MOSFET 22 drives transformer 23 to convert the DC power into high frequency power and transmit the high frequency power to the secondary side of transformer 23 via winding Ns2. The thus transmitted high frequency power is rectified and smoothed by diode 25 and capacitor 28. In this instance, although a high frequency voltage is induced also in winding Ns1 by the on/off driving of MOSFET 22, since MOSFET 26 is in an inoperative state and accordingly in a high impedance state, no power transmission takes place via winding Ns1.

Controller 5 performs PWM control of the DRV signals based on a detected value of the AC output voltage to control the output voltage to a fixed voltage and controls converter circuit 2 and switch circuit 4 to generate a sine wave voltage of a half cycle in such a manner as described above.

As described above, in the inverter apparatus of the present invention, generation of a sine wave voltage of a half cycle by converter circuit 2 and switch circuit 3 (that is, shaping of a positive sine half wave voltage) and generation of another sine wave voltage of a half cycle by converter circuit 2 and switch circuit 4 (that is, shaping of a negative sine half wave voltage) are performed alternately for each half cycle of the AC output voltage to obtain an AC output voltage of a sine wave.

Further, in the inverter apparatus of the present embodiment, also such prevention of short-circuiting of the output by MOSFET 26 and MOSFET 27 as described below is performed.

While power is supplied via winding Ns1 of transformer 23, MOSFET 26 performs on/off operations in the phase opposite to that of MOSFET 22, but when power supply via winding Ns1 is stopped and a power supplying operation via winding Ns2 is started, MOSFET 26 is put into an off state and exhibits a high impedance state as viewed from the output of switch circuit 4, thereby preventing short-circuiting of the output. Also with regard to MOSFET 27, when a power supplying operation via winding Ns1 is started similarly, MOSFET 27 is put into an off state and exhibits a high impedance state as viewed from the output of switch circuit 3, thereby preventing short-circuiting of the output.

<Second Embodiment>

The foregoing description of the inverter apparatus of the first embodiment relates to a case wherein the load to which the inverter apparatus supplies AC power is a pure resistor and does not give rise to distortion of the output voltage. Generally, where the load to an inverter apparatus is a complex load, the output current and the output voltage exhibit a displacement in phase and reactive power is yielded in the output of the inverter, which gives rise to distortion in waveform of the output voltage. Here, description is given of an inverter apparatus wherein, even when a complex load is connected to the inverter apparatus, no waveform distortion is produced in the sine wave AC output voltage of the inverter apparatus by reactive power yielded on the output side.

The inverter apparatus of the present embodiment has a substantially same construction as that of the inverter apparatus of the first embodiment described above except that it additionally includes an output voltage waveform distortion detecting circuit for detecting waveform distortion produced in the output AC voltage. Here, overlapping description of common components to those of the first embodiment is omitted, and only differences in operation are described.

Figure 6:
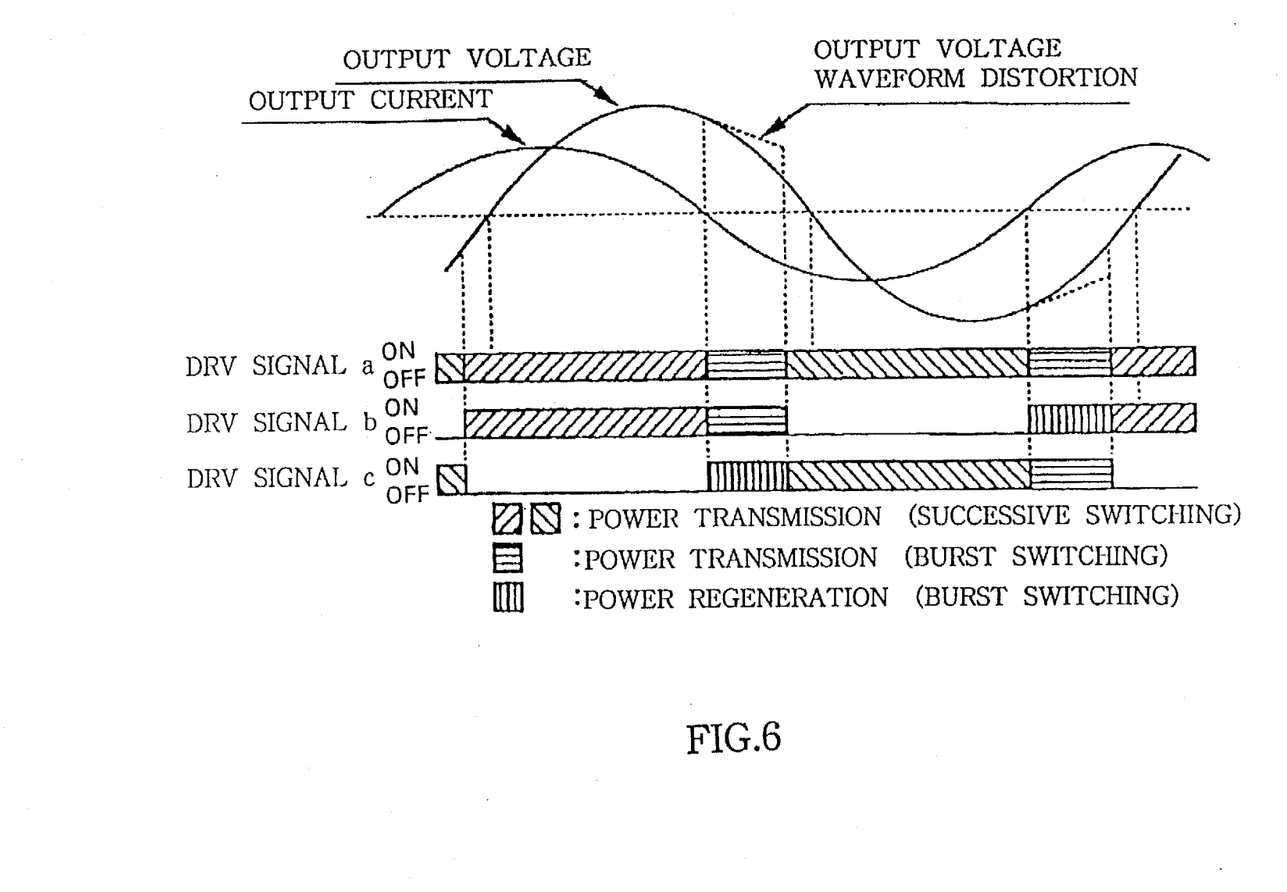
FIG. 6 is a time chart illustrating a current waveform distortion reducing operation of the inverter apparatus and a waveform diagram illustrating an output voltage waveform distortion of the inverter apparatus.

FIG. 6 is a time chart illustrating a current waveform distortion reducing operation of the inverter apparatus and a waveform diagram illustrating an output voltage waveform distortion of the inverter apparatus;

Where the load to the inverter apparatus is a complex load, such an output voltage waveform distortion as indicated by a dotted line in, FIG. 6 is yielded in the waveform of the output voltage at AC output terminal 29a. The output voltage waveform distortion is yielded in each of positive and negative half cycles of the output voltage waveform.

For example, if an output voltage waveform distortion is yielded upon formation of a positive sine half wave voltage, then the error signal exhibits a reduction in level by the waveform distortion, and if the distortion is excessively large, then the error signal exhibits a zero-cross and changes its polarity to the negative. Consequently, production of an output voltage waveform distortion can be discriminated by detecting a transition of the error signal from the positive to the negative. From this, in the present embodiment, waveform shaping circuit 6 detects whether the error signal is positive or negative, and when a positive sine half wave voltage is to be generated, only while the error signal is positive, waveform shaping circuit 6 produces DRV signal a from the PWM signal and produces DRV signal b by inverting DRV signal a in phase, but in any other case, waveform shaping circuit 6 put both of DRV signals a and b into an off state. Where waveform shaping circuit 6 operates in this manner, for example, when reactive power is yielded, upon formation of a positive sine half wave voltage, on the output side and a waveform distortion is produced in the output AC voltage, the production of the waveform distortion can be discriminated by detecting an off state of DRV signal a. Also a waveform distortion upon formation of a negative sine half wave voltage can be detected in a similar manner.

If DRV signal a is put into an off state upon formation of a positive or negative sine half wave voltage, then the output voltage waveform distribution detecting circuit detects the state as a state wherein a waveform distortion is produced in the output AC voltage.

In the following, reduction of the output AC voltage waveform distortion upon formation of positive and negative sine half wave voltages by controller 5 is described.

First, an operation for reduction of the output voltage waveform distortion in a positive half cycle of the output voltage waveform is described.

Figure 7:
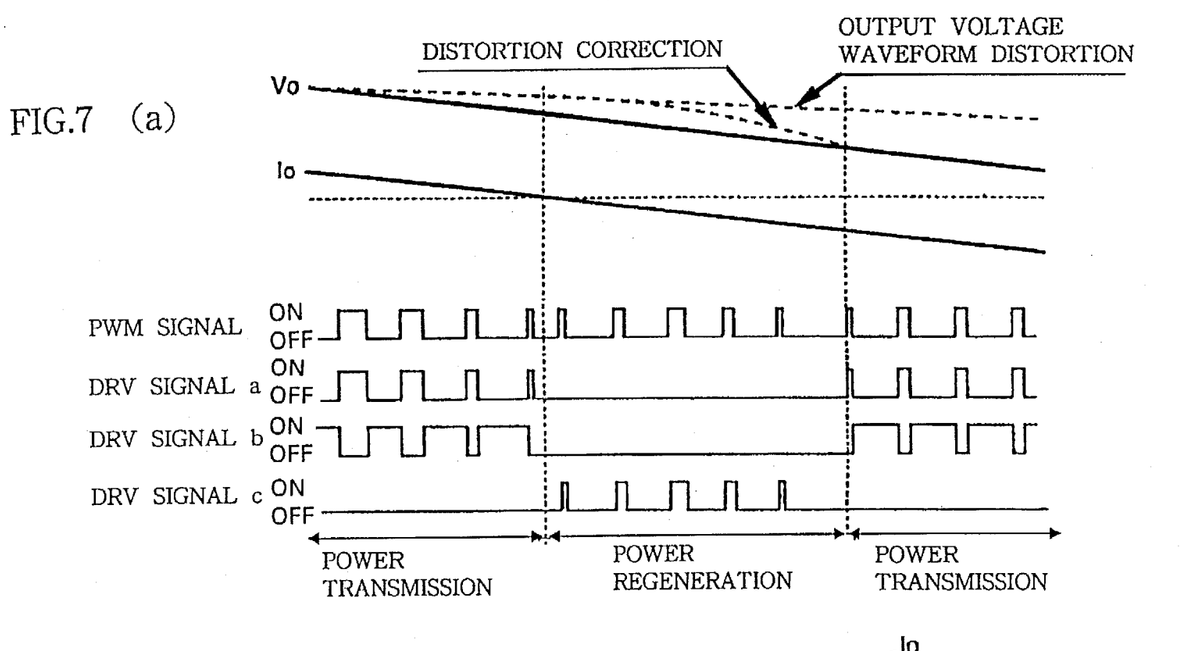
FIG. 7(a) is a timing chart regarding DRV signals a, b and c in a positive half cycle and a waveform diagram showing an output voltage and an output current.
FIG. 7(b) is an equivalent circuit diagram of the inverter apparatus shown in FIG. 4 upon voltage regeneration.

FIGS. 7(a) and 7(b) illustrate reduction of the output voltage waveform distortion in a positive half cycle of the output voltage waveform, and particularly FIG. 7(a) is a time chart regarding DRV signals a, b and c and a waveform diagram of the output voltage and the output current, and FIG. 7(b) is an equivalent circuit diagram of inverter apparatus 1 upon voltage regeneration.

As seen from FIG. 7(a), before a distortion is yielded in a voltage waveform in a positive half cycle, controller 5 continuously drives MOSFET 22 and MOSFET 26 in the opposite phases to each other to generate an AC voltage free from a distortion at the output thereof.

If a distortion is produced in the output voltage by a complex load and the waveform distortion is detected by the output voltage waveform distortion detecting circuit, then controller 5 stops the driving of MOSFET 22 and MOSFET 26 and drives MOSFET 27 based on the PWM signal so that the reactive power which is a cause of the waveform distortion is feed back to the input side. In particular, when the driving of MOSFET 22 and MOSFET 26 is stopped, power is accumulated in winding Ns2 of transformer 23 by the reactive power during an on-period of MOSFET 27, and the accumulated power is transmitted, during an off-period of MOSFET 27, from winding Np2 to the primary side via diode 21. In this manner, the switching operation for feeding back the reactive power to the input side continues until the waveform distortion is eliminated (power regeneration). An equivalent circuit of inverter apparatus 1 upon this power regeneration is shown in FIG. 7(b).

After the waveform distortion is eliminated, controller 5 stops the driving of MOSFET 27 and resumes opposite phase driving of MOSFET 22 and MOSFET 26 to send out power to the output side. Upon this power transmission, a PWM signal is produced based on the error signal in a state free from a waveform distortion, and DRV signals a and b are produced based on the PWM signal. It is to be noted that the state free from a waveform distortion here signifies a state wherein DRV signal a is put into on-off driving by waveform shaping circuit 6 again, that is, a state after the error signal whose polarity has been in the negative due to a waveform distortion returns its polarity to the negative due to a reduction of the waveform distortion.

As described above, controller 5 alternately performs a power transmission operation to the output side by converter circuit 2 and switch circuit 3 and a reactive power feeding back operation by a PWM switching operation of MOSFET 27 while detecting a distortion of the output voltage waveform to reduce the output voltage waveform distortion.

Another operation of reducing the output voltage waveform distortion in a negative half cycle of the output voltage waveform is described below.

Figure 8:
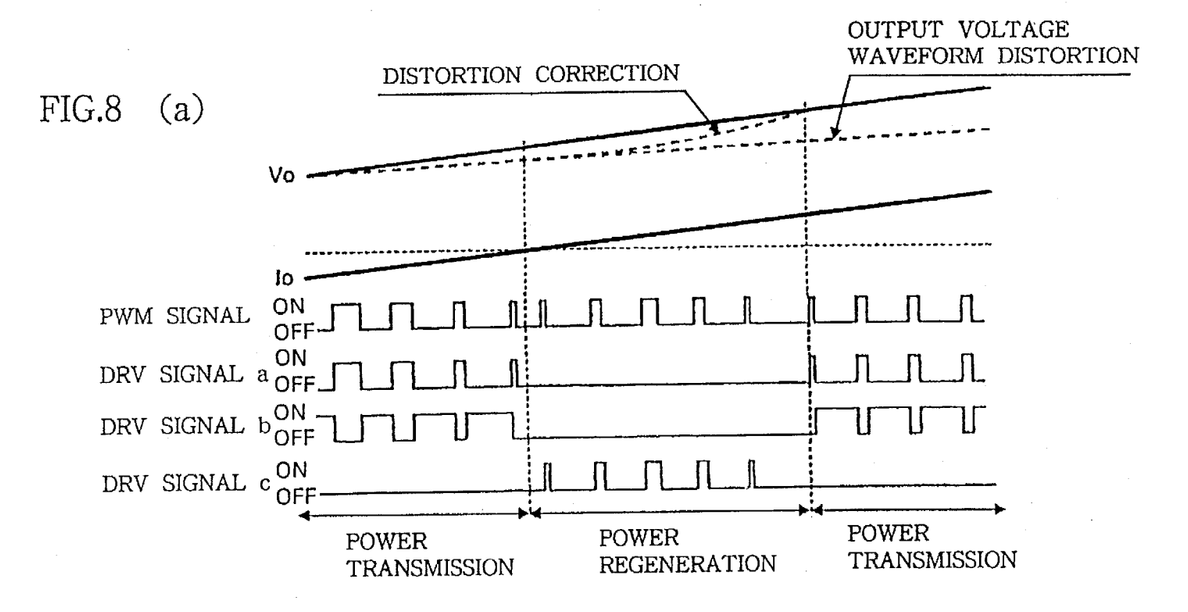
FIG. 8(a) is a timing chart regarding DRV signals a, b and c in a negative half cycle and a waveform diagram showing an output voltage and an output current.
FIG. 8(b) is an equivalent circuit diagram of the inverter apparatus shown in FIG. 4 upon voltage regeneration.

FIGS. 8(a) and 8(b) illustrate reduction of the output voltage waveform distortion in a negative half cycle of the output voltage waveform, and particularly, FIG. 8(a) is a timing chart of DRV signals a, b and c in a negative half cycle and a waveform diagram showing the output voltage and the output current, and FIG. 8(b) is an equivalent circuit diagram of inverter apparatus 1 upon voltage regeneration.

Similarly to the operation in a positive half cycle described above, reduction of a waveform distortion is performed also in a negative half cycle. In particular, as seen in FIG. 8(a), if a distortion of the output voltage waveform is detected while controller 5 performs a power transmitting operation to the output side by converter circuit 2 and switch circuit 3, then controller 5 changes over its operation to a reactive power feeding back operation by a PWM switching operation of MOSFET 26 to correct the distortion of the output voltage waveform (power regeneration). Then, if the waveform distortion is eliminated, then controller 5 performs a power transmitting operation to the output side by converter circuit 2 and switch circuit 3 again. The output voltage waveform distortion is reduced in this manner. An equivalent circuit of inverter apparatus 1 upon the power regeneration in a negative half cycle is shown in FIG. 8(b).

What is claimed is:

1. An inverter apparatus which includes a converter circuit which receives a DC voltage as an input thereto and converts the DC voltage into positive and negative half sine wave voltages of a voltage value corresponding to a width of a driving pulse and produces an AC output voltage from an output of said converter circuit, comprising:

first and second switch circuits receiving outputs of the positive and negative half sine wave voltages of said converter circuit, respectively, and a controller for generating a plurality of pulses within a half cycle of the AC output voltage, and when the positive half sine wave voltage is to be formed, providing said second switch circuit in an off state and driving said first switch circuit and said converter circuit, but when the negative half sine wave voltage is to be formed, providing said first switch circuit in an off state and driving said second switch circuit and said converter circuit, based on the pulse signal;

said controller modulating the width of each pulse of the pulse signal so that the AC output voltage may be a sine wave AC voltage.

2. An inverter apparatus as claimed in claim 1, wherein said converter circuit includes a transformer and is constructed such that power is accumulated by DC current in an on state thereof and the accumulated power is transmitted in an off state thereof to obtain positive and negative DC outputs, and said controller includes a sine wave reference voltage generator for generating a sine wave reference voltage, an error amplifier for comparing the AC output voltage with the sine wave reference voltage to obtain an error signal and outputting the error signal, a reference clock generator for generating a reference clock signal, a PWM circuit for producing a saw-tooth pulse synchronized with the reference clock signal and comparing the saw-tooth pulse with the error signal to produce a PWM signal of a pulse width corresponding to a voltage level of the error signal, and a waveform shaping circuit for producing, based on the PWM signal, a first driving signal for driving said converter circuit and second and third driving signals for driving said first and second switch circuits, respectively, said waveform shaping circuit being constructed such that, when the positive half sine wave voltage is to be formed, the PWM signal is used as the first driving signal and a signal obtained by inverting the first driving signal in phase is used as the second driving signal whereas the third driving signal is put into an off state, but when the negative half sine wave voltage is to be formed, the PWM signal is used as the first driving signal and a signal obtained by inverting the first driving signal in phase is used as the third driving signal whereas the second driving signal is put into an off state.

3. An inverter apparatus as claimed in claim 2, wherein said waveform shaping circuit detects the polarity of the error signal between positive and negative and is constructed such that, when the positive half sine wave voltage is to be formed, only when the error signal is positive, the PWM signal is used as the first driving signal, but when the error signal is not positive, the first and second driving signals are put into an off state, but when the negative half sine wave voltage is to be formed, only when the error signal is negative, the PWM signal is used as the first driving signal, but when the error signal is not negative, the first and third driving signals are put into an off state, and said controller further includes an output voltage waveform distortion detecting circuit for detecting, when the first driving signal is put into an off state upon formation of the positive or negative half sine wave voltage, the state as a state wherein a waveform distortion is produced in the AC output voltage by reactive power, and uses, if a waveform distortion is detected upon formation of the positive half sine wave voltage, the PWM signal as a driving signal to drive only said second switch circuit so that the reactive power is accumulated in said transformer and transmitted to the input side, but uses, if a waveform distortion is detected upon formation of the negative half sine wave voltage, the PWM signal as a driving signal to drive only said first switch circuit so that the reactive power is accumulated in said transformer and transmitted to the input side.

4. A sine wave AC voltage forming method for producing a sine wave AC voltage from a converter circuit which converts an input DC voltage into positive and negative half sine wave voltages of a voltage value corresponding to a width of a driving pulse, comprising the steps of:

providing first and second switch circuits for receiving outputs of the positive and negative half sine wave voltages of said converter circuit; and generating a plurality of pulses within a half cycle of the AC output voltage outputted from said converter circuit, providing when the positive half sine wave voltage is to be formed, said second switch circuit into an off state while driving said first switch circuit and said converter circuit, but providing, when the negative half sine wave voltage is to be formed, said first switch circuit into an off state while driving said second switch circuit and said converter circuit, based on the pulse signal, and modulating the width of each pulse of the pulse signal so that the AC output voltage may be a sine wave AC voltage.

5. A sine wave AC voltage forming method as claimed in claim 4, wherein said converter circuit is constructed so as to have a transformer structure wherein power is accumulated by DC current in an on state of said converter circuit and the accumulated power is transmitted in an of state of said converter circuit to obtain positive and negative DC outputs, and an output voltage of said converter circuit is compared with a sine wave reference voltage to produce an error signal and the error signal is compared with a saw-tooth pulse synchronized with a reference clock signal to produce a PWM signal of a pulse width corresponding to a voltage level of the error signal, and a first driving signal for driving said converter circuit and second and third driving signals for driving said first and second switch circuits, respectively, are produced based on the PWM signal, and then, when the positive half sine wave voltage is to be formed, the PWM signal is used as the first driving signal and a signal obtained by inverting the first driving signal in phase is used as the second driving signal whereas the third driving signal is put into an off state, but when the negative half sine wave voltage is to be formed, the PWM signal is used as the first driving signal and a signal obtained by inverting the first driving signal in phase is used as the third driving signal whereas the second driving signal is put into an off state.

6. A sine wave AC voltage forming method as claimed in claim 5, wherein the polarity of the error signal between positive and negative is detected and, when the positive half sine wave voltage is to be formed, only when the error signal is positive, the PWM signal is used as the first driving signal, but when the error signal is not positive, the first and second driving signals are put into an off state, but when the negative half sine wave voltage is to be formed, only when the error signal is negative, the PWM signal is used as the first driving signal, but when the error signal is not negative, the first and third driving signals are put into an off state, and, when the first driving signal is put into an off state upon formation of the positive or negative half sine wave voltage, the state is detected as a state wherein a waveform distortion is produce din the AC output voltage by reactive power, and then, if a waveform distortion is detected upon formation of the positive half sine wave voltage, the PWM signal is used as a driving signal to drive only said second switch circuit so that the reactive power is accumulated in said transformer and transmitted to the input side, but uses, if a waveform distortion is detected upon formation of the negative half sine wave voltage, the PWM signal as a driving signal to drive only said first switch circuit so that the reactive power is accumulated in said transformer and transmitted to the input side.

* * * * *